United States Patent
Wu et al.

(10) Patent No.: US 9,322,172 B2
(45) Date of Patent: Apr. 26, 2016

(54) CONCRETE STRUCTURE MEMBER STRENGTHENED WITH PRESTRESSED FRP ELEMENTS

(75) Inventors: Zhishen Wu, Jiangsu (CN); Gang Wu, Jiangsu (CN); Kentaro Iwashita, Jiangsu (CN); Jianbiao Jiang, Jiangsu (CN); Min Zhang, Jiangsu (CN)

(73) Assignee: SOUTHEAST UNIVERSITY (CN)

( * ) Notice: Subject to any disclaimer, the term of this patent is extended or adjusted under 35 U.S.C. 154(b) by 423 days.

(21) Appl. No.: 13/810,594

(22) PCT Filed: Dec. 8, 2010

(86) PCT No.: PCT/CN2010/079577
§ 371 (c)(1),
(2), (4) Date: Mar. 28, 2013

(87) PCT Pub. No.: WO2012/006851
PCT Pub. Date: Jan. 19, 2012

(65) Prior Publication Data
US 2013/0183497 A1    Jul. 18, 2013

(30) Foreign Application Priority Data
Jul. 16, 2010  (CN) .................... 2010 2 0261312 U

(51) Int. Cl.
| | | |
|---|---|---|
| *E04C 5/07* | (2006.01) | |
| *E04C 5/08* | (2006.01) | |
| *E04G 23/02* | (2006.01) | |
| *B32B 3/30* | (2006.01) | |
| *B32B 13/12* | (2006.01) | |

(52) U.S. Cl.
CPC . *E04C 5/073* (2013.01); *B32B 3/30* (2013.01); *B32B 13/12* (2013.01); *E04C 5/085* (2013.01); *E04G 23/0218* (2013.01); *Y10T 428/24612* (2015.01); *Y10T 428/249921* (2015.04)

(58) Field of Classification Search
CPC ........... E04C 5/073; E04C 5/085; B32B 3/30; B32B 13/12; B32B 3/12; E04G 23/0218; Y10T 428/24612
See application file for complete search history.

(56) References Cited

U.S. PATENT DOCUMENTS

| | | | | |
|---|---|---|---|---|
| 5,613,334 A | * | 3/1997 | Petrina | 52/223.1 |
| 6,177,185 B1 | * | 1/2001 | Face, Jr. | 428/325 |
| 6,416,693 B1 | | 7/2002 | Lockwood | 264/36.19 |

FOREIGN PATENT DOCUMENTS

| | | | |
|---|---|---|---|
| CN | 201460025 | 5/2010 | ............. E04C 3/20 |
| JP | 9242342 | 9/1997 | ............. E01D 21/00 |

(Continued)

OTHER PUBLICATIONS

JP09242342A_English Translation, Mar. 8, 1996.*

(Continued)

*Primary Examiner* — Aaron Austin
*Assistant Examiner* — Jasper Saberi
(74) *Attorney, Agent, or Firm* — Hayes Soloway P.C.

(57) ABSTRACT

A concrete structure member strengthened with prestressed FRP elements includes a concrete structure body and a prestressed FRP element arranged on the former. An epoxy resin overlay surrounding the prestressed FRP element is provided to wrap it up, and a polymer concrete supplemental layer is provided outside the epoxy resin overlay. The concrete structure member can uniformly and effectively transfer the stress from the prestressed FRP element.

6 Claims, 3 Drawing Sheets

(56) References Cited

FOREIGN PATENT DOCUMENTS

| | | | | |
|---|---|---|---|---|
| JP | 10102791 | 4/1998 | .............. | E04G 23/02 |
| JP | 2003176633 | 6/2003 | .............. | E01D 21/00 |

OTHER PUBLICATIONS

PCT International Search Report issued in corresponding application No. PCT/CN2010/079577, dated Apr. 28, 2011 (6 pgs).

* cited by examiner

CONCRETE STRUCTURE MEMBER STRENGTHENED WITH PRESTRESSED FRP ELEMENTS

FIELD OF THE INVENTION

The present invention relates to a concrete structure member, in particular to a concrete structure member strengthened with prestressed FRP bars.

BACKGROUND OF THE INVENTION

Fiber reinforced polymer (FRP) bars are featured with light weight, high strength, and high corrosion resistance, etc., and have been widely applied in building projects to substitute steel strands and steel bars. Concrete structures strengthened with embedded FRP bars are one of the main applications, in which FRP bars are put into preformed grooves on the surface of structure, and a binding material is poured into the grooves, so that the FRP bars and the structure form a whole, so as to improve structural properties. Prestressing technique is introduced subsequently, to give full play to the high strength effect of FRP bars. Such a technical application of FRP bars can effectively improve rigidity, bending resistance, and shear resistance bearing capacity of structures. However, the failure mode is not ideal, and premature debonding failure or splitting failure often occurs at the interface. For example, splitting failure may occur at the interface between FRP bars and binding material, at the interface between concrete and binding material, and in the binding material, and splitting failure of concrete may occur near the groove surface. Such premature failures will surely constrain the play of the high strength performance of FRP bars.

DISCLOSURE OF THE INVENTION

Technical Problem

The technical problems to be solved by the present invention is to provide a concrete structure member strengthened with prestressed FRP bars, in which the FRP bars will not have premature debonding failure at the interface, and the stress from the FRP bars can be transferred uniformly and effectively.

Technical Solution

The present invention comprises prestressed FRP bars and a concrete structure member body, wherein, the prestressed FRP bar is arranged in the concrete structure member body, and the prestressed FRP bar is surrounded by an epoxy resin cladding layer, outside of which a polymer-concrete thickening layer is arranged.

In an aspect of the present invention, a groove is made on the bottom surface of the concrete structure member, and the prestressed FRP bar is arranged in the groove; the epoxy resin cladding layer is filled in a part of the groove and surrounds the prestressed FRP bar; the polymer-concrete thickening layer is filled in the rest part of the groove. To ensure enough thickness of the bonding layer, the polymer-concrete thickening layer can be made into a dome shape. Preferably, the depth and the width of the groove are equal to each other, and are 1.5 times of the diameter of the prestressed FRP bar.

In another aspect of the present invention, the prestressed FRP bar, epoxy resin cladding layer, and polymer-concrete thickening layer are arranged on the bottom surface of the concrete structure member, and the polymer-concrete thickening layer bonds the prestressed FRP bar and epoxy resin cladding layer to the bottom surface of the concrete structure member body. Preferably, the polymer-concrete thickening layer is made into a dome shape.

Beneficial Effects

With the epoxy resin cladding layer and polymer-concrete thickening layer, the concrete structure member of the present invention can ensure enough bonding strength between the FRP bar and the concrete structure member body and thereby prevent premature debonding failure at the interface. Since the polymer-concrete has high rigidity, it constrains the deformation of epoxy resin, and thereby ensures uniform and effective transfer of the stress in the FRP bar. Meanwhile, the bonding strength between the polymer-concrete and the concrete body is very good; moreover, the polymer-concrete thickening layer with certain thickness ensures excellent bonding strength at the interface and defers debonding failure at the interface. With the dome shaped polymer-concrete thickening layer, the FRP bar has enough bonding thickness; therefore, inadequate bonding resulted from inadequate embedding depth can be avoided.

EMBODIMENTS

Example 1

Figure 1:
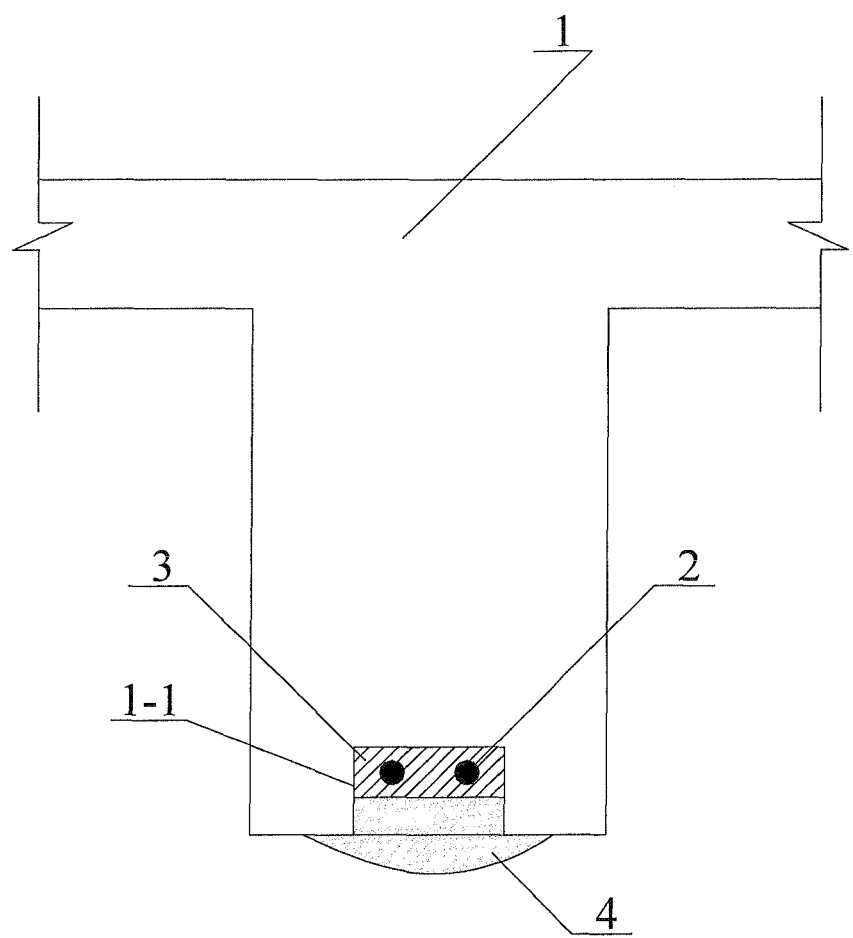
FIG. 1 is a schematic structural diagram of embodiment 1 of the present invention.

As shown in FIG. 1, in this example, the concrete structure member strengthened with prestressed FRP bar comprises a concrete structure member body 1 and prestressed FRP bar 2. A groove 1-1 is made on the bottom surface of the concrete structure member body 1, and the prestressed FRP bar 2 is arranged in the groove 1-1.

Preferably, the depth and the width of the groove 1-1 are equal to each other, and are 1.5 times of the diameter of the prestressed FRP bar 2.

An epoxy resin cladding layer 3 is arranged in one part of the groove 1-1. The epoxy resin cladding layer 3 is arranged around the prestressed FRP bar 2 and surrounds the FRP bar 2. A polymer-concrete thickening layer 4 is arranged in the rest part of the groove 1-1. After the polymer-concrete thickening layer 4 fills up the rest part of the groove 1-1, the bottom surface of the concrete structure member body 1 can be shaped as dome or plane.

Example 2

Figure 2:
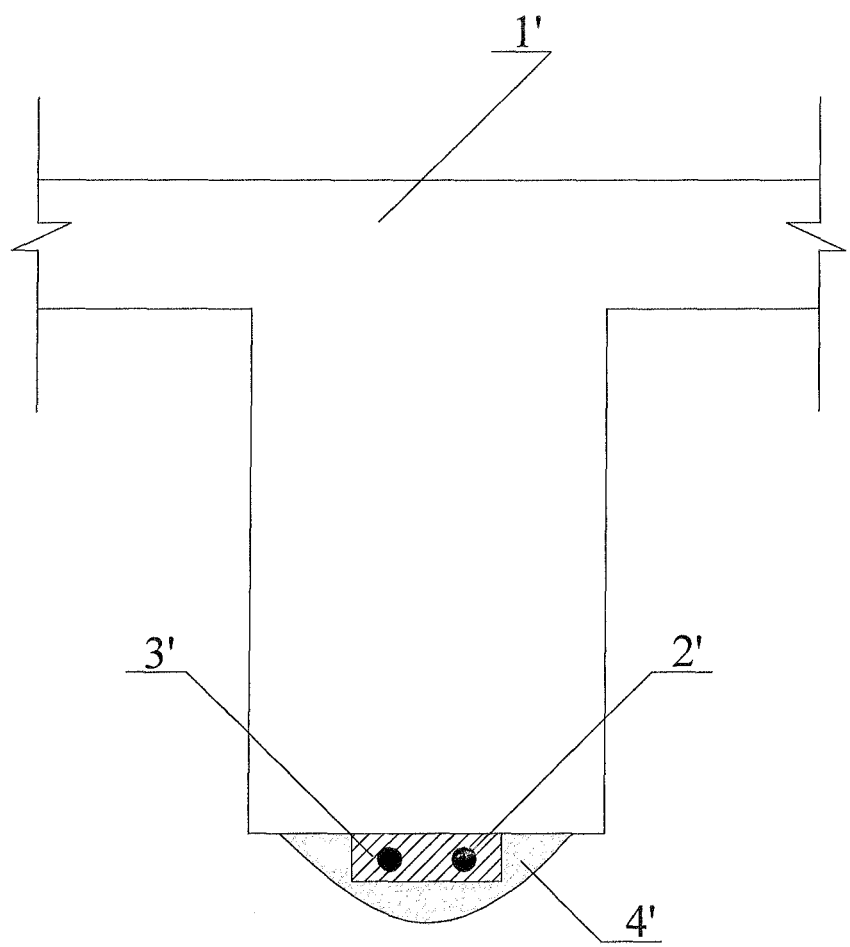
FIG. 2 is a schematic structural diagram of embodiment 2 of the present invention.

As shown in FIG. 2, in this example, the concrete structure member strengthened with prestressed FRP bar comprises a concrete structure member body 1' and prestressed FRP bar 2'. The prestressed FRP bar 2' is arranged on the bottom surface of the concrete structure member body 1'. An epoxy resin cladding layer 3' is arranged around the prestressed FRP bar 2' and surrounds the FRP bar 2'. A polymer-concrete thickening layer 4' is arranged outside of the epoxy resin cladding layer 3', to bond the prestressed FRP bar 2' and the epoxy resin cladding layer 3' to the bottom surface of the concrete structure member body 1'.

Figure 3:
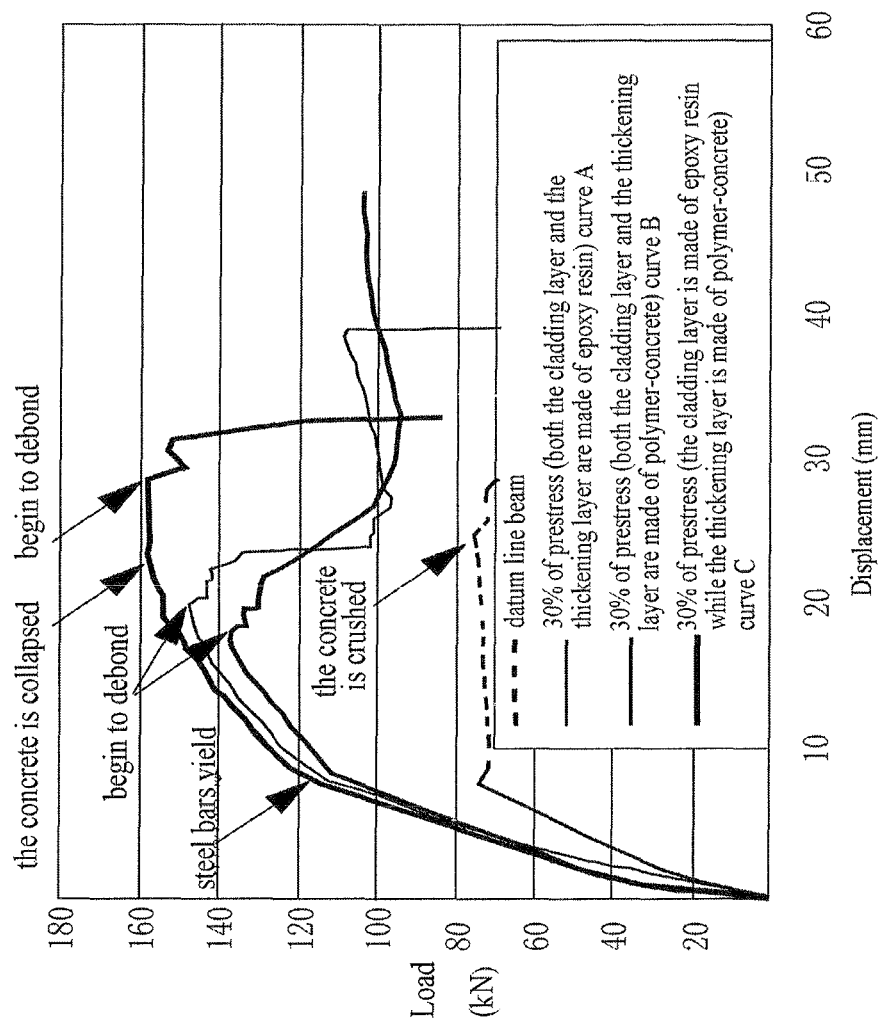
FIG. 3 is a curve comparison diagram among the effects of three tests.

As shown in FIG. 3, under the same prestress condition, curve A represents a case in which both the cladding layer and the thickening layer are made of epoxy resin; curve B represents a case in which both the cladding layer and the thickening layer are made of polymer-concrete; curve C represents a case in which the cladding layer is made of epoxy resin while the thickening layer is made of polymer-concrete. As it can be seen from the figures, the ultimate bearing capacity for C is higher than that for A and B. The points a, b, and c on curves A, B, and C represent the time when debonding begins to occur on the FRP bars, wherein, the time when debonding begins to occur on the FRP for curve C is later than the time when debonding begins to occur on the FRP bar for curves A and B; specifically, debonding begins to occur on the FRP bar for curves A and B before the concrete is crushed; in contrast, debonding begins to occur on the FRP bar for curve C after the concrete is crushed, which means the concrete structure member has higher ductility. The curve C is better than the curves A and B, in terms of improvement of bearing capacity and structural ductility.

The invention claimed is:

1. A concrete structure member strengthened with prestressed FRP bar, comprising prestressed FRP bar and a concrete structure member body, wherein, the prestressed FRP bar is arranged on the concrete structure member body, an epoxy resin cladding layer is arranged around the prestressed FRP bar to completely surround the prestressed FRP bar, and a polymer-concrete thickening layer having a dome shape is arranged over the epoxy resin cladding layer bonding with both the epoxy resin cladding layer and the concrete structure member body.

2. The concrete structure member strengthened with prestressed FRP bar according to claim 1, wherein, a groove is made on a bottom surface of the concrete structure member, the prestressed FRP bar is arranged in the groove; the epoxy resin cladding layer is filled into one part of the groove and surrounds the prestressed FRP bar, and the polymer-concrete thickening layer is filled into the rest part of the groove.

3. The concrete structure member strengthened with prestressed FRP bar according to claim 2, wherein, the polymer-concrete thickening layer forms a dome shape on the bottom surface of the concrete structure member body.

4. The concrete structure member strengthened with prestressed FRP bar according to claim 2, wherein, the depth and the width of the groove are equal to each other, and are 1.5 times of a diameter of the prestressed FRP bar.

5. The concrete structure member strengthened with prestressed FRP bar according to claim 1, wherein, the prestressed FRP bar, epoxy resin cladding layer, and polymer-concrete thickening layer are arranged on a bottom surface of the concrete structure member, and the polymer-concrete thickening layer bonds the prestressed FRP bar and epoxy resin cladding layer to the bottom surface of the concrete structure member body.

6. The concrete structure member strengthened with prestressed FRP bar according to claim 3, wherein, the depth and the width of the groove are equal to each other, and are 1.5 times of the diameter of a prestressed FRP bar.

* * * * *